Dec. 12, 1933.    G. BENEDETTO    1,938,994
ELECTRIC UPSETTING
Filed Nov. 27, 1931
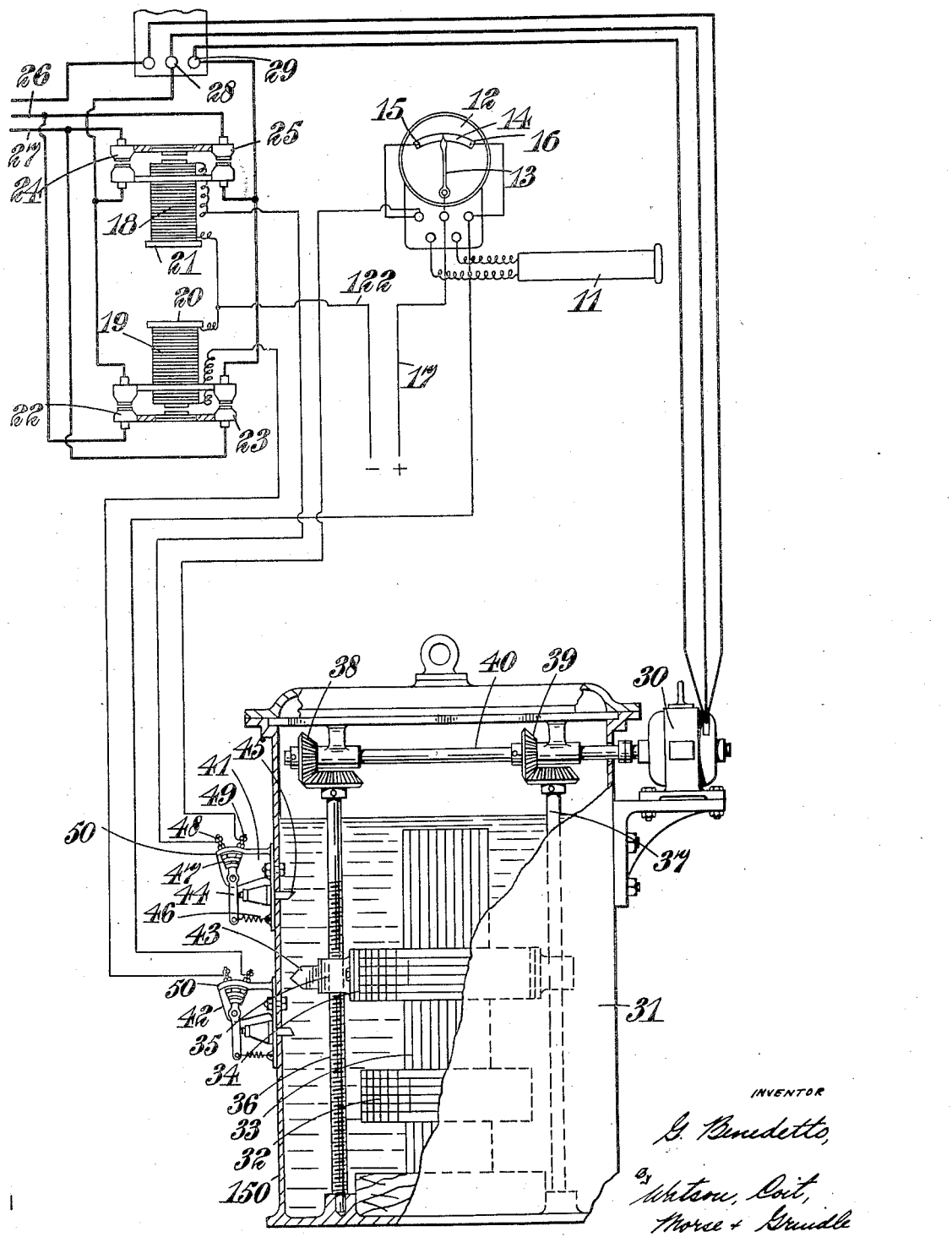
INVENTOR
G. Benedetto,
By Wilson, Coit,
Morse + Grindle
ATTYS Patented Dec. 12, 1933

1,938,994

UNITED STATES PATENT OFFICE 1,938,994

ELECTRIC UPSETTING

Giuseppe Benedetto, Novara, Italy, assignor to Omes Holding Company Limited, London, England, a British company Application November 27, 1931, Serial No. 577,621, and in Great Britain November 28, 1930

5 Claims. (Cl. 219—3)

This invention comprises improvements in or relating to electric upsetting.

It is known in electric upsetting that there is a risk of overheating the work due to the increase of electric current which occurs when a head is upset on the end of a bar. The large cross-section which is provided by the upset portion of the bar permits the passage of a large current which is capable of overheating the portions of the work which remain of smaller diameter unless special means are provided to regulate current.

It is an object of the present invention to provide novel means for preventing overheating of the work.

The present invention provides a control device for an electric upsetting machine comprising in combination a temperature-responsive element so located as to respond rapidly to variations in temperature of the workpiece, an electric control circuit having contacts operated by said temperature-responsive element at a predetermined maximum temperature of the work and automatic regulating means for the heating current of the work which are controlled by the said control circuit.

In a preferred form of the apparatus there are provided both a maximum and a minimum contact in the control circuit, both these contacts are operated by the temperature-responsive element, the maximum contact operates a relay for setting in operation the automatic regulating means in such manner as to decrease the heating current, and the minimum contact operates a relay for setting in operation the automatic regulating means in such manner as to increase the heating current.

The preferred form of automatic regulating means comprises an electric transformer having a part movable in such manner as to vary the degree of magnetic leakage between the primary and secondary windings. The movable portion may be constituted by one of the windings themselves, for example the secondary winding. The movable portion of the transformer may be operated by a mechanical reduction gear from a reversible electric motor and the relays aforesaid be so connected with their relay contacts in the operating circuit of the reversible electric motor that the motor is operated in one direction by one relay and in the other direction by the other relay.

Means may be provided if desired for cutting the control circuit out of operation when the movable part of the transformer reaches one or other of its extreme positions of adjustment.

The following is a description by way of example of one form of apparatus in accordance with the invention:—

The accompanying drawing illustrates the essential parts of the control device according to the present invention in diagrammatic form, together with the electrical connections thereof.

The electric upsetting machine employed may be of any desired or usual construction such for example as that claimed in United States Patent No. 1,878,810, granted September 20, 1932.

Such machines in general comprise an anvil, a vice in the jaws of which the workpiece to be upset is held, means for passing a large heating current of low voltage through the workpiece from the vice jaws to the anvil so as to heat the portion of the workpiece extending between the vice jaws and the anvil to softening temperature, and means for forcing the workpiece against the anvil while in this softened condition so as to upset an enlarged head on the end thereof. The electric current is ordinarily supplied by a stepdown transformer the secondary of which is connected by heavy flexible leads to the anvil on the one hand and to the vice jaws upon the other.

According to the present invention there is provided in a convenient position close to the work a form of radiation pyrometer 11 (see drawing). This comprises a thermo-couple temperature-responsive element which may be located at a distance of, say, fifteen centimetres from the heated portion of the workpiece in such a position as to be directly exposed to the radiant heat therefrom. Between the thermo-couple and the work there may be provided an adjustable diaphragm, (not shown in the drawing) for example an iris diaphragm, whereby the size of the beam of heat rays falling upon the thermocouple can be adjusted to compensate, say, for variations in the size of the work. The thermocouple is connected in the usual way to a temperature-indicating device 12, the movable pointer 13 of which operates over a scale 14. At a suitable point on the scale corresponding to the maximum temperature which it is desired the work shall attain there is provided an electric contact 15 adapted to make electrical connection with the pointer. At a second point on the scale corresponding to a lower or minimum temperature there is a second similar contact. The pointer 13 is connected by lead 17 to a source of electric supply and the two contacts are connected respectively to a maximum relay winding 18 and a minimum relay winding 19 on a maximum relay 20 and minimum relay 21. The other terminals of the two windings are connected by lead 122 to the other pole of electric supply.

Each of the relays 20, 21 controls two pairs of contacts 22 and 23 for one relay and 24, 25 for the other relay, which are closed when the relays are operated. The contacts 22, 23 of the maximum relay 20 when closed serve to connect two electric supply lines 26, 27 to two rotor supply contacts 28, 29 respectively of an electric motor 30 and the two contacts 24, 25 of the minimum relay 21 serve to connect the same supply lines 26, 27 to the same rotor supply contacts 29, 28 but with the polarity reversed. Thus, operation of the maximum relay will serve to operate the electric motor in one direction of rotation and operation of the minimum relay will serve to operate the electric motor in the reverse direction of rotation.

The electric motor 30 is shown as a three-phase alternating current motor and the supply lines 26, 27 constitute the lines corresponding to two of the phases of the motor, but it will be understood that a direct current motor could alternatively be employed, the relays 20, 21 serving to reverse the polarity of the armature connections while the polarity of the field connections remains unchanged.

An electric regulating transformer 31 is interposed between the electric supply and the step-down transformer of the upsetting machine. The regulating transformer 31 is provided with a fixed primary coil 32 mounted upon an iron core 33 and a movable secondary coil 34 which is mounted to slide upon the core towards and from the primary 32. The movable secondary coil carries screw-threaded lugs 35 on each side which engage two lead screws 36, 37 and the lead screws are operated by bevel gearing 38, 39 from a shaft 40 actuated by the motor 30 aforesaid. Thus, operation of the maximum relay 20 due to the temperature of the work reaching such a point as to close the maximum contact 15 by the pointer 13 operated by the temperature-responsive thermo-couple 11, will cause the electric motor 30 to rotate in such a direction as to move the secondary winding 34 along the magnetic core 33 away from the primary winding 32 of the regulating transformer 30. The secondary 34 is connected to the primary winding of the usual step-down transformer of the upsetting machine (not shown in the drawing) and, therefore, the working current will by this means be reduced and the work prevented from heating further.

On the other hand, in the initial stages of the heating of the work before it has reached the above-described minimum temperature of the contact 16, and at any subsequent stage if the temperature should fall below the minimum, the contact of the minimum relay 16 will be closed and the electric motor will be operated in such a direction as to advance the secondary winding 34 towards and as close as possible to the primary winding 32 of the regulating transformer, in which position the maximum working current is obtained.

In order to prevent overstraining of the gearing and other parts in the transformer 31, by the electric motor 30 continuing to act upon them after the limit of free movement has been reached, limit-switches 41, 42 are inserted in the circuit between the maximum and minimum contacts 15, 16 and the corresponding relays 20, 21 which contacts are opened by a cam 43, carried by the secondary winding 34, when it reaches one or the other of its extreme positions.

The limit-switches 41, 42 comprise brackets which are bolted to the casing of the transformer 31 and carry operating levers 44. A plunger 45 extends through the casing to the interior so as to be operated upon by the cam 43 and the outer end of the plunger 45 bears against the lever 44. The lever is drawn firmly against the plunger by a return-spring 46. At the other end of the lever it carries an insulated contact piece 47 which rubs over two contacts 48, 49. The contacts 48, 49 are carried in a flange 50 on the bracket of the switch and are insulated therefrom. To these contacts the connecting lead between the maximum or minimum contact and the relay winding 18 or 19 as the case may be is connected. The disposition of the parts is such that in the normal position as illustrated in the drawing the contacts 48, 49 are connected together by the insulated sector 47 but when the cam 43 pushes out the plunger 45 the lever 44 is tilted sideways and the connecting sector 47 breaks the circuit at the contact 48. The contacts 48, 49 may comprise a spring ball or other device for ensuring firm contact if this is found necessary.

The regulating transformer 31 is preferably mounted in an oil-containing casing 150 so that it operates immersed in oil.

It is to be observed that inasmuch as the temperature control afforded by the device according to the present invention depends upon a direct response to the actual temperature of the work, regulation is superior to that of devices in which the maximum heating current is regulated without direct reference to the temperature of the work and this makes the device applicable to operation on various metals in which the relation between specific resistance and temperature over a similar range of temperatures differs from one another. Where different degrees of maximum temperature are called for in working on different metals the corresponding regulation of the control device can readily be effected by modifying the setting of the iris diaphragm in front of the temperature-responsive element. In any given case this may generally be done by experimenting upon one or two pieces, after which subsequent workpieces may be upset automatically without risk of overheating.

This device is especially valuable in the electric upsetting of large pieces of work where the control of the maximum temperature is somewhat difficult. By this means, for example, it has been found possible to upset heavy heads on the ends of large rods, the heads being, for example, of the order of 25 lbs. in weight.

I claim:

1. In electric upsetting apparatus the combination of a vice, an anvil, a transformer for supplying electric current to a piece of work held between the vice and the anvil, said transformer having a part movable in such manner as to vary the degree of magnetic leakage between the primary and secondary windings thereof, a temperature-responsive element so located as to respond rapidly to variations in temperature of the workpiece, an electric control circuit having contacts operated by said temperature-responsive element at a predetermined maximum temperature of the work, and automatic regulating means actuated by said contacts and operatively connected to said movable part of said transformer to reduce the energy supplied to the workpiece upon the temperature thereof reaching a point at which it actuates the said temperature-responsive element.

2. In an electric upsetting machine the combination as claimed in claim 1 wherein the movable portion of the transformer is constituted by one of the windings themselves (for example the secondary winding).

3. In an electric upsetting apparatus the combination of an anvil, a vice to support a workpiece so that it extends between the vice and the anvil, an electric transformer for supplying electrical energy to heat said work between the vice and the anvil, said transformer having a movable part such that movement thereof varies the degree of magnetic leakage between the primary and secondary windings of the transformer, a temperature-responsive element so located as to respond rapidly to the temperature of the workpiece, maximum and minimum contacts operated by said temperature-responsive element at predetermined maximum and minimum temperatures of the workpiece, relays operated by said maximum and minimum contacts respectively, an electric motor controlled by said relays so as to rotate in one direction when one relay is operated, and in the opposite direction when the other relay is operated, operative connections between said electric motor and said movable part of the transformer to increase the magnetic leakage thereof when the maximum temperature is reached, and to decrease said leakage when the minimum temperature is reached, and limit switches operated at the extremes of movement of said movable part of the transformer to cut the electric motor out of action upon said movable part reaching the limit of its movement in either direction.

4. In an electric upsetting machine the combination as claimed in claim 1 wherein the movable portion of the transformer is operated by a mechanical reduction gear from a reversible electric motor and wherein there are provided both a maximum and a minimum contact in the control circuit, both these contacts being operated by the temperature-responsive element, the maximum contact operating a relay for setting in operation the automatic regulating means in such manner as to decrease the heating current, and the minimum contact operating a relay for setting in operation the automatic regulating means in such manner as to increase the heating current and the relays aforesaid are so connected with their relay contacts in the operating circuit of the reversible electric motor that the motor is operated in one direction by one relay and in the other direction by the other relay.

5. In an electric upsetting machine the combination as claimed in claim 1 wherein there are provided both a maximum and a minimum contact in the control circuit, both these contacts being operated by the temperature-responsive element, the maximum contact operating a relay for setting in operation the automatic regulating means in such manner as to decrease the heating current, and the minimum contact operating a relay for setting in operation the automatic regulating means in such manner as to increase the heating current and wherein means are provided for cutting the control circuit out of operation when the movable part of the transformer reaches one or other of its extreme positions of adjustment.

GIUSEPPE BENEDETTO.